(12) United States Patent
Francke et al.

(10) Patent No.: US 9,346,361 B2
(45) Date of Patent: May 24, 2016

(54) NON-RAIL-BOUND VEHICLE

(75) Inventors: Juergen Francke, Berlin (DE); Frank Gerstenberg, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 41 days.

(21) Appl. No.: 14/122,865

(22) PCT Filed: May 23, 2012

(86) PCT No.: PCT/EP2012/059613
§ 371 (c)(1),
(2), (4) Date: Nov. 27, 2013

(87) PCT Pub. No.: WO2012/163763
PCT Pub. Date: Dec. 6, 2012

(65) Prior Publication Data
US 2014/0097054 A1    Apr. 10, 2014

(30) Foreign Application Priority Data
May 27, 2011   (DE) .......................... 10 2011 076 623

(51) Int. Cl.
*B60L 5/00* (2006.01)
*B60L 5/12* (2006.01)
*B60L 5/08* (2006.01)
(Continued)

(52) U.S. Cl.
CPC ... *B60L 5/12* (2013.01); *B60L 5/08* (2013.01); *B60L 5/19* (2013.01); *B60L 5/36* (2013.01); *B60L 2200/26* (2013.01); *B60L 2240/12* (2013.01)

(58) Field of Classification Search
CPC ............... B60L 5/08; B60L 5/19; B60L 5/36; B60L 11/1837; B60L 2200/26; Y02T 10/7005; Y02T 90/14; Y02T 90/128; Y02T 10/7088
USPC ................................................ 191/59.1–60.5
See application file for complete search history.

(56) References Cited

U.S. PATENT DOCUMENTS 1,828,945 A * 10/1931 Rossman ........................... 191/3
5,124,510 A *  6/1992 Garfinkle ......................... 191/65
(Continued)

FOREIGN PATENT DOCUMENTS

CH           217666 A     10/1941
DE          2600158 A1     7/1976
(Continued)

*Primary Examiner* — Jason C Smith
(74) *Attorney, Agent, or Firm* — Laurence Greenberg; Werner Stemer; Ralph Locher

(57) ABSTRACT

A non-rail bound vehicle, in particular a commercial vehicle or a bus, has a current collector for feeding electrical energy from a two-pole overhead line. The contact wires of the overhead line are configured as forward and return conductors, and each can be contacted by at least one contact strip of the current collector. Due to the fact that the current collector is provided with two support extension arms, which are tiltably and rotatably hinged to both the vehicle and a rocker bearing the contact strips such that the rocker can be both raised and lowered and also can be moved transversely to the direction of travel, the current collector can be safely coupled to and decoupled from the contact wires, even at higher driving speeds of the vehicle. Furthermore, lateral inaccuracies with respect to a lane while steering the vehicle can be permanently compensated for by the current collector.

10 Claims, 3 Drawing Sheets

(51) Int. Cl.
B60L 5/19 (2006.01)
B60L 5/36 (2006.01)

(56) References Cited

U.S. PATENT DOCUMENTS

| | | | | |
|---|---|---|---|---|
| 5,954,171 | A * | 9/1999 | Gramatke et al. | 191/60.3 |
| 6,474,455 | B1 * | 11/2002 | Blaschko et al. | 191/45 R |
| 6,591,953 | B2 * | 7/2003 | Blanvillain | 191/60.2 |
| 2011/0106349 | A1 * | 5/2011 | Sakita | 701/22 |
| 2013/0105264 | A1 * | 5/2013 | Ruth et al. | 191/59.1 |
| 2014/0005871 | A1 * | 1/2014 | Saito et al. | 701/22 |
| 2014/0041951 | A1 * | 2/2014 | Tojima et al. | 180/2.1 |
| 2014/0097054 | A1 * | 4/2014 | Francke et al. | 191/59.1 |
| 2014/0138200 | A1 * | 5/2014 | Dronnik et al. | 191/59.1 |
| 2014/0195091 | A1 * | 7/2014 | Saito | 701/22 |
| 2014/0224609 | A1 * | 8/2014 | Saito et al. | 191/59.1 |

FOREIGN PATENT DOCUMENTS

| | | |
|---|---|---|
| DE | 3244945 C1 | 1/1984 |
| DE | 216686 A1 | 12/1984 |
| DE | 69215698 T2 | 5/1997 |
| DE | 19914566 A1 | 10/2000 |
| DE | 10256705 A1 | 7/2004 |
| EP | 0046562 A1 | 3/1982 |
| FR | 881611 A | 4/1943 |
| GB | 1480311 | 7/1977 |
| JP | 5271011 | 6/1977 |
| WO | 9311960 A1 | 6/1993 |

* cited by examiner

NON-RAIL-BOUND VEHICLE

BACKGROUND OF THE INVENTION

Field of the Invention

The invention relates to a non-rail-bound vehicle, in particular a truck or a bus, with a current collector for feeding in electrical energy from a two-pole overhead conductor. The contact wires of the overhead conductor are contacted by at least one sliding shoe of the current collector.

In the case of rail-bound electric vehicles, such as for example electric locomotives, trains and streetcars, electrical energy is supplied via a conducting line system with a defined path which is arranged to match the course of the rails. In this case, electric rail-bound vehicles manage with only a live forward conductor, while the return conductor is formed by the rails. The forward conductor can be in the form of a contact wire in an overhead conductor system, or also as a power rail which is arranged directly alongside the traffic lane, or even underfloor. On the other hand, the provision of energy to non-rail-bound vehicles represents a far more complicated situation. On the one hand, the return conductor must be installed as a separate contact wire, alongside the forward conductor in the overhead conductor. On the other hand, non-rail-bound vehicles have a great degree of sideways movement within their traffic lane.

Thus, for example, a two-pole overhead conductor system for electrically driven vehicles in public local passenger transportation is known from printed patent specification DE 32 44 945 C1. Of the two overhead conductor wires, which run parallel to each other, one carries a voltage relative to ground, and the other serves as the neutral conductor. A trolleybus is equipped with a pair of trolley collectors to enable it to travel around within the overhead conductor system. In operation, the pair of trolley collectors adopts a raised position, in which their sliding shoes lie correctly against the two overhead conductor wires. The trolley collectors are subject to the force from a raising spring, which provides the necessary contact pressure by the sliding shoes on the overhead conductor wires. The trolley collectors are mounted on the roof of the trolleybus with articulation about an axis which runs horizontally and across the direction of travel, so that they can be lowered and then raised again. For the purpose of compensating for sideways deviations during travel relative to the course of the overhead conductor wires, the trolley collectors can also rotate about a vertical axis, so that they can maintain sliding contact with the overhead conductor wires. However, trolleybuses are vehicles which are restricted to a defined traffic lane, because sharp swerving maneuvers or over-taking maneuvers which require leaving the lane lead to a loss of contact between the trolley collectors and the overhead conductor wires.

Published patent application DE 102 56 705 A1 discloses a non-rail-bound vehicle, such as those used as trucks in open-cast mining for the transportation of ore, coal or spoil. For the purpose of supplying electricity for a motor in the vehicle, two pantographs are provided, which in operation are in contact with the contact wires of a two-pole overhead conductor via sliding shoes. So that the vehicle is only ever steered in such a way that the sliding shoes do not leave the contact wires, sensor bars which carry magnetic field sensors are arranged on the pantographs. These determine the magnetic field strength of the magnetic field generated by the current in the contact wire with such accuracy that the distance of the sensor from the contact wire can be determined on the basis of the measured field strength value. The information about the position of the sensor relative to the contact wire and thereby about the position of the pantograph and thereby of the entire vehicle relative to the contact wire can be communicated to the vehicle driver by means of a display unit so that he can perform appropriate steering movements immediately. It is also possible to supply the information from the sensors to a control unit for the automatic steering of the vehicle.

The trolley collectors known from trolleybuses suffer from the disadvantage that it is relatively difficult to hook the vehicles' trolley collectors onto and unhook them from the wires, and that when performing jerky steering actions it is possible for so-called collector derailing to occur, i.e. a loss of contact between the sliding shoes and the overhead conductor wires. As a result, this system is unsuitable for roadways with an at least partially electrified traffic lane with non-electrified traffic lanes running in parallel therewith—for example, on multi-lane freeways. Finally, trolley collectors are also unreliable at relatively high speeds of 80 to 100 km/h, at which commercial vehicles may drive on freeways.

The solutions known from open-cast mining vehicles with one current collector each per contact wire also have the disadvantage that lateral movements of the vehicle in excess of 0.4 m may result in a loss of contact with the overhead line. In order to avoid such losses of contact, the current collector arrangement can also be designed so that it is wider than the vehicle, which is dangerous on public roads outside an opencast mining area and is not permitted under road traffic regulations.

BRIEF SUMMARY OF THE INVENTION

Hence, the object underlying the invention is to provide a generic vehicle on which the current collector can, even at higher travel speeds of 80 to 100 km/h, for example, be safely hooked onto and unhooked from the wires when operated on multi-lane routes with a traffic lane which is electrified, at least along sections, and can reliably maintain contact with the contact wire.

The object is achieved according to the invention by a non-rail-bound vehicle having a current collector. According to this, the current collector has two support booms, each of which is articulated, on the vehicle and on a rocker on which are mounted the sliding shoes, so that it can tilt and pivot in such a way that the rocker can be both raised and lowered and also is able to move at an angle to the direction of travel. These degrees of freedom of movement of the rocker permit both a simple automatic hooking onto and unhooking from the contact wire and also a continuous compensation for lane position inaccuracies by lateral movement of the rocker. By this means it is possible to maintain reliable contact between the current collector and the overhead conductor's contact wires even at high travel speeds of up to 100 km/h. Here, the sliding shoes of the rocker extend horizontally and across the direction of travel of the vehicle. The rocker then has a lateral working range which is determined by the length of the sliding shoes. Across this working range, the rocker slides along the contact wires in order to provide traction energy for the vehicle.

In one advantageous form of embodiment of the inventive vehicle, the current collector has a positioning boom which is articulated so that it can tilt and pivot both on the vehicle and on the rocker, parallel to the support booms, and at the vehicle end is coupled to a positioning drive in such a way that the latter can pivot the positioning boom, and with it the rocker, sideways. The positioning drive makes possible a rotary movement about a vertical axis of rotation which is joined to the positioning boom so that it cannot rotate. Because of their coupling, the pivoting movement of the positioning boom is followed by the support booms, which are guided parallel to each other by the rocker of the current collector.

In a preferred embodiment of the inventive vehicle, the rocker has for each contact wire two sliding shoes, arranged one behind the other in the direction of travel, each aligned across the direction of travel and having a planned working range provided for sliding along the contact wire. In the normal operating state, the four sliding shoes together with the contact wires along which they slide lie roughly in a horizontal plane. The length of the sliding shoes defines a working range within which sliding contact with the contact wire is allowed. To avoid going out of this planned working range when driving inaccuracies cause deviations from the middle of the lane, the rocker can be repositioned by a sideways pivoting movement with the help of the positioning drive.

In a preferred embodiment of the inventive vehicle, the current collector is articulated onto the vehicle in a transitional area from the driver's cab to a load body. This permits articulation of the current collector either directly on the chassis of the vehicle or on an enclosure joined to it, in order to affix the current collector rigidly and in order that it is largely decoupled in respect of vibrations from the load body and the driver's cab. The small installation height which the current collector then requires makes possible a favorable weight distribution, which has little effect on the handling of the inventive vehicle.

In an advantageous embodiment of the inventive vehicle, the support and positioning booms extend in the direction of travel from the vehicle to the lowered rocker, while they enclose an acute angle with the direction of travel when the rocker is contacting the contact wires. The orientation of the booms towards the front, over the driver's cab, means there is no conflict with any high load body on the vehicle. With this embodiment, the rocker is pushed by the booms, which is possible because of the use of sliding shoes with their low drag force on the contact wires.

In another advantageous form of embodiment of the inventive vehicle, each support boom is coupled to an elevating spring, the restoring force of which raises the rocker and presses the sliding shoes against the contact wires. These tension springs can be used to adjust both the acceleration with which the rockers are raised and also the force with which they press against the contact wire.

In another advantageous embodiment the inventive vehicle has a position sensor for detecting the actual position of the vehicle relative to the contact wires. This position sensor can for example be in the form of a video camera which is affixed to the vehicle, and is linked to an image analysis unit which continuously monitors the accuracy with which the moving vehicle stays in its lane. By comparison with a reference image which, for example, would appear when driving in the middle of the lane, a measure of the sideways deviation from the lane can be determined in order to feed this to a regulation facility.

The inventive vehicle will preferably incorporate a regulation facility which is designed to determine, from a comparison of the actual detected position of the vehicle relative to the contact wires and a predefined target position, a setpoint variable for the rockers which would maintain correct contact with the contact wires within a working range of the sliding shoes, and to actuate the positioning drives in accordance with the set point variable which has been determined. With the help of the regulation facility, it is possible to compensate automatically for sideways driving inaccuracies which do not exceed a limiting value, determined by the design, so that the sliding shoes always slide within their working range along the contact wires.

It is further preferable if the regulation facility of the inventive vehicle is designed to actuate the positioning drive in such a way that, by a to-and-fro pivoting movement of the rocker, the sliding shoes are worn down uniformly across their working range. For example, when driving on a straight highway it is possible to avoid using a costly zigzag path for the contact wires to effect uniform wear across the sliding shoes, in that the regulation facility replaces this relative zigzag movement by a sideways back and forth movement of the rocker.

BRIEF DESCRIPTION OF THE SEVERAL VIEWS OF THE DRAWING

Further advantages and characteristics of the inventive vehicle are revealed by the following description of an exemplary embodiment, which is explained in more detail by reference to the drawings, which schematically illustrate FIG. 1 a frontal view of a vehicle in accordance with the invention looking in the direction opposite to the travel, FIG. 2 a view looking down onto the current collector of the vehicle shown in FIG. 1, FIG. 3 a side view of the current collector on the vehicle shown in FIG. 1 and FIG. 4 a side view of a inventive vehicle in accordance with the invention.

DESCRIPTION OF THE INVENTION

Figure 1:
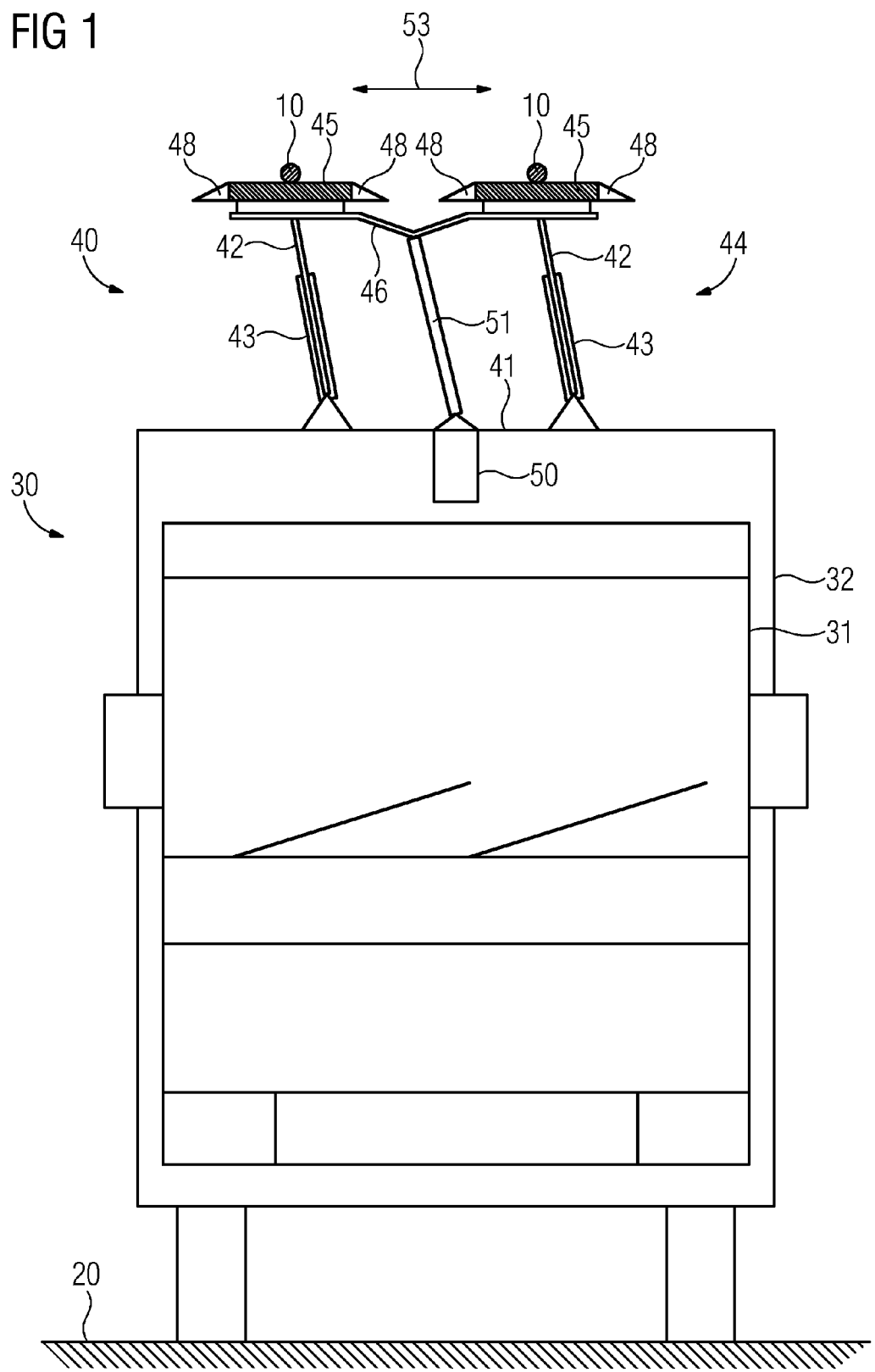
Figure 4:
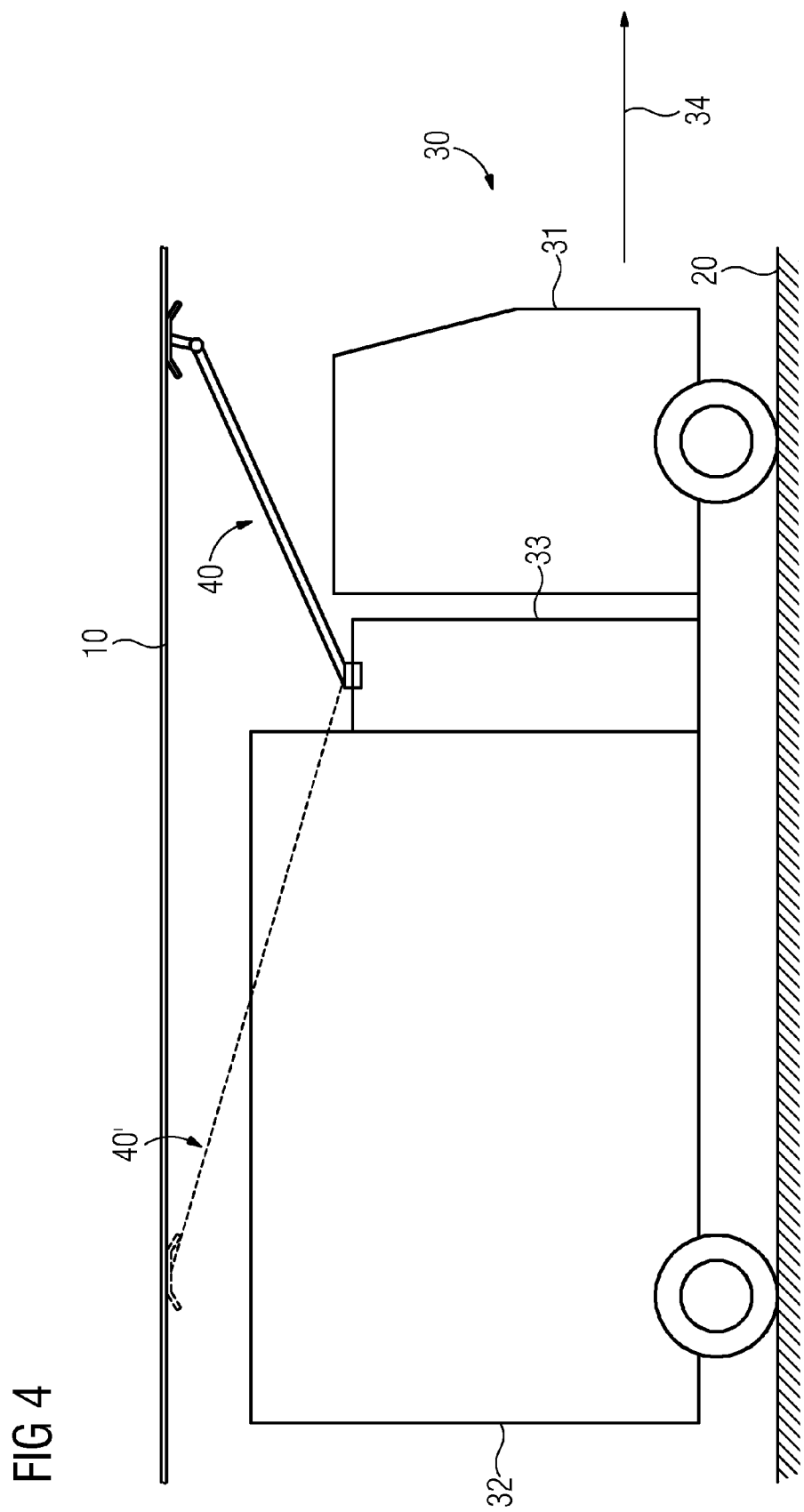

As shown in FIG. 1 and FIG. 4, a two-pole overhead conductor with a forward conductor and, running parallel to it, a return conductor, is provided as the contact wires 10 for the electrification of a traffic lane 20. They are arranged roughly centrally above the traffic lane 20 by means of infrastructure facilities which are not shown, such as masts, brackets, steady arms, load-bearing cables, hangers and the like. The traffic lane 20 can be, for example, the right hand traffic lane of a multi-lane freeway. By this means it is possible to feed electrical energy into vehicles 30 by means of a current collector 40, in order to provide traction energy for an electric or hybrid drive in the vehicle 30, or in order to tap off to the overhead conductor braking energy from the vehicle 30.

Figure 2:
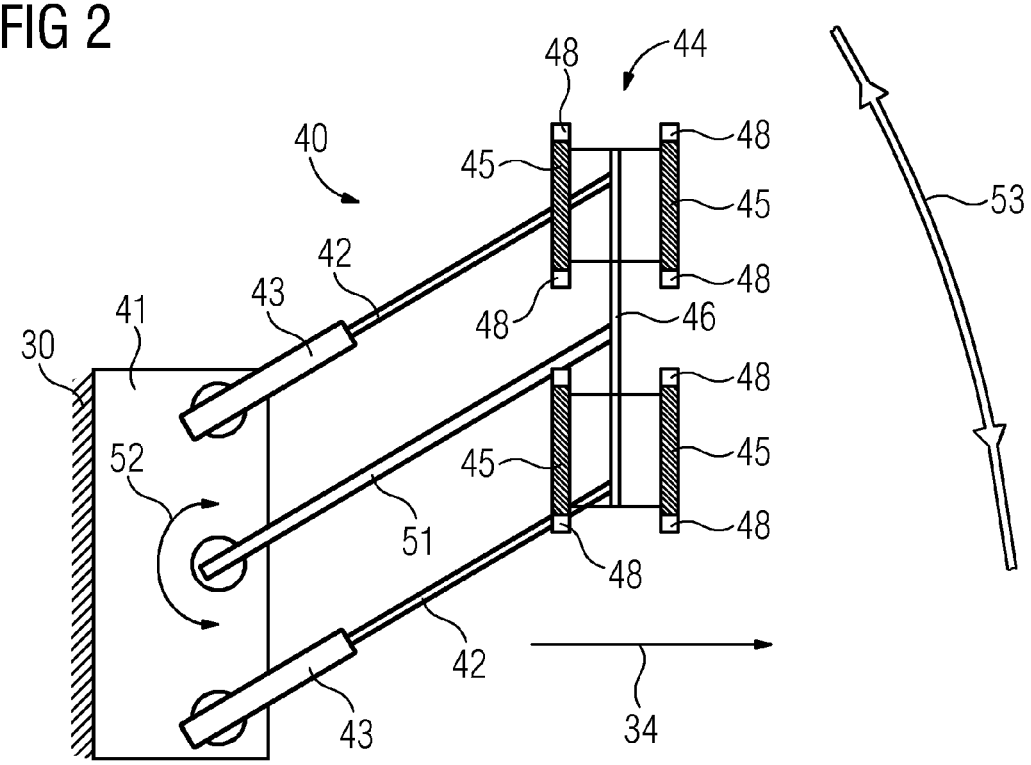
Figure 3:
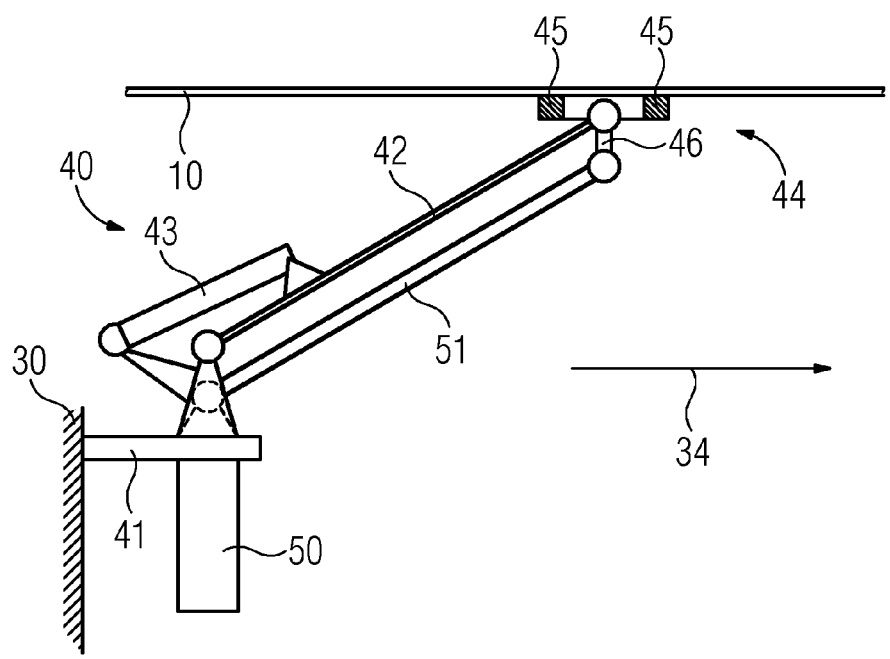

As shown in FIG. 1 to FIG. 3, the current collector 40 is mounted on a platform 41 affixed on the vehicle 30. The platform 41 can be in the form of a rectangular plate, on which sit rotation/tilt joints through which two support booms 42 and a positioning boom 51 are articulated onto the vehicle 30. Each of the booms, 42 and 51 respectively, can here tilt about a horizontal axis, so that a rocker 44 which is carried by one of the support booms 42 of the current collector 40 can be raised and lowered vertically. For this purpose, each support boom 42 is coupled to a raising spring 43, the restoring force from which raises the boom 42 and lifts the rocker 44 with a defined pressure against the contact wires 10. Each of the booms, 42 and 51 respectively, can also rotate about a vertical axis, so that the rocker 44 can make a pivoting movement 53 across the direction of travel 34 of the vehicle. The pivoting movement 53 is adjusted, for example, by a positioning drive 50 affixed to the platform 41, the rotational movement 52 of which is transmitted to the rocker 44 by the positioning boom 51.

For each contact wire 10 the rocker 44 on the current collector 40 has two sliding shoes 45 arranged one behind the other in the direction of travel 34. The sliding shoes 45 are aligned across the direction of travel 34 and have a planned working range for sliding along the contact wire 10.

As shown in FIG. 1 to FIG. 4, the current collector 40 is articulated onto the vehicle 30 in a transitional area from a driver's cab 31 to the load body 32. Here, the support and positioning booms, 42 and 51 respectively, point forwards, that is they make an acute angle with the direction of travel 34. Thus when rocker 44 is lowered the booms, 42 and 51 respectively, from the vehicle 30 to the rocker 44 point in the direction of travel 34. When the rocker 44 is in contact with the contact wires 10, the former is pushed into sliding contact with the contact wires 10 by the booms 42 and 51, as applicable. With this advantageous arrangement of the current collector 40, it takes up no space in the region of the load body 32.

Not shown is a regulation facility which, in combination with a position sensor which is also not shown and the positioning drive 50, effects a pivoting movement 53 by the current collector 40 in order to compensate for lane position inaccuracies during the travel of the vehicle 30 in such a way that the sliding contacts 45 always make contact with the contact wires 10 of the overhead conductor within their planned working range. To this end, the position sensor detects the actual position of the vehicle 30 relative to the contact wires 10. The position sensor can be in the form, for example, of a video camera with a fixed mounting on the vehicle which determines the actual position by making comparisons with reference images. In the regulation facility, a continual comparison takes place of the actual position which is detected against a defined planned position of the vehicle 30 relative to the contact wires 10. From the deviations between the actual and planned positions of the vehicle 30, a setpoint variable is determined for the rocker 44, in order to keep the contact between the sliding shoes 45 and the contact wire 10 constantly within its planned working region by pivoting the rocker 44. There is particular advantage if the regulation facility actuates the positioning drive 50 in such a way that, by a to-and-fro pivoting movement of the rocker 44, the contact shoes 45 are uniformly worn down across their working region. This makes is possible to forgo the zigzag path of the overhead conductor wires, as known from rail-bound technology.

All in all, the invention provides a non-rail-bound vehicle 30 on which the current collector 40 can be safely docked onto and undocked from the contact wires 10 of the overhead conductor even at speeds of up to 100 km/h, and which by sideways pivoting movements 53 continuously compensate for lane position inaccuracies while the vehicle is traveling. Particularly by comparison with the familiar trolley collectors 40' on trolleybuses, which as shown in FIG. 4 are pulled along behind relative to the direction of travel 34, the current collector 40 is low-wear, easily accessible and can be hooked onto and unhooked from the contact wires 10 with essentially no imposed forces. The current collector 40 is, furthermore, capable of crossing segment boundaries in the overhead conductor. By comparison with trolleybuses, trucks 30 have a significantly smaller vertical distance between the load body 32 and the contact wire 10, so that the current collector 40 can be arranged in the lowered transitional region to the driver's cab 31 without colliding with the load body 34. This is achieved by the unconventional forward orientation—i.e. in the direction of travel 34—of the boom, 42 or 51 respectively, of the current collector 40.

The invention claimed is:

1. A non-rail-bound vehicle, comprising:
    a current collector for feeding in electrical energy from a two-pole overhead conductor, said current collector having sliding shoes for contacting contact wires of the two-pole overhead conductor being forward and return conductors, each of the conductors being contacted by at least one of said sliding shoes, said current collector having a rocker and two support booms, said sliding shoes mounted on said rocker, each of said support booms being articulated, on the vehicle and on said rocker, so that said two support booms can tilt about a horizontal axis such that said rocker can be both raised and lowered vertically and pivot about vertical axes such that said rocker can be moved at an angle to a direction of travel; and
    a positioning drive for adjusting a pivoting movement of said support booms.

2. The non-rail-bound vehicle according to claim 1, wherein said current collector has a positioning boom which is articulated both on the vehicle and on said rocker, such that said positioning boom can tilt and pivot parallel to said support booms, and at a vehicle end said positioning boom is coupled to said positioning drive such that said positioning drive can pivot said positioning boom, and with it said rocker, sideways.

3. The non-rail-bound vehicle according to claim 2, wherein said support booms and said positioning boom from the vehicle to a lowered said rocker point in the direction of travel, and when said rocker is contacting the contact wires said support booms and said positioning boom enclose an acute angle with the direction of travel.

4. The non-rail-bound vehicle according to claim 1, wherein said rocker has for each of the contact wires two said sliding shoes disposed one behind the other in the direction of travel, said sliding shoes are aligned across the direction of travel and have a planned working range for sliding along the contact wires.

5. The non-rail-bound vehicle according to claim 1, further comprising:
    a driver's cab; and
    a load body, said current collector is articulated onto the vehicle in a transitional area from said driver's cab to said load body.

6. The non-rail-bound vehicle according to claim 1, further comprising elevating springs, each of said support booms is coupled to one of said elevating springs, a restoring force of said elevating springs raises said rocker and presses said sliding shoes against the contact wires.

7. The non-rail-bound vehicle according to claim 1, further comprising a position sensor for detecting an actual position of the vehicle relative to the contact wires.

8. The non-rail-bound vehicle according to claim 7, further comprising a regulation facility configured to determine a set point variable for said rocker from a comparison of the actual position of the vehicle as detected and a predefined target position, relative to the contact wires, which would maintain contact with the contact wires correctly within a working range of said sliding shoes, and to actuate said positioning drive in accordance with a set point variable which has been determined.

9. The non-rail-bound vehicle according to claim 8, wherein said regulation facility is configured to actuate said positioning drive such that, by a to-and-fro pivoting movement of said rocker, said sliding shoes are worn down uniformly across their working range.

10. The non-rail-bound vehicle according to claim 1, wherein the non-rail-bound vehicle is selected from the group consisting of trucks and buses.

* * * * *